(12) United States Patent
Hattori et al.

(10) Patent No.: US 7,920,376 B2
(45) Date of Patent: Apr. 5, 2011

(54) ELECTRONIC APPARATUS AND GUIDING MEMBER

(75) Inventors: Masahiko Hattori, Kawasaki (JP); Shinji Aoki, Kawasaki (JP); Tadanori Tachikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 12/218,073

(22) Filed: Jul. 11, 2008

(65) Prior Publication Data
US 2009/0180245 A1 Jul. 16, 2009

Related U.S. Application Data

(63) Continuation of application No. PCT/JP2006/300281, filed on Jan. 12, 2006.

(51) Int. Cl.
*H05K 7/00* (2006.01)
*H05K 5/00* (2006.01)
*H05K 7/14* (2006.01)
*A47B 81/00* (2006.01)
*G06F 13/00* (2006.01)

(52) U.S. Cl. ......... 361/679.22; 361/679.21; 361/679.27; 312/223.2; 312/223.3; 312/223.1; 710/303; 174/535

(58) Field of Classification Search ............. 361/679.21, 361/1, 2, 679.22, 796, 797, 737, 752, 756, 361/679.01, 679.02, 679.08, 679.09, 679.3, 361/679.55–679.59; 439/64, 55, 632, 541.5, 439/79, 78, 62, 377, 630, 108, 607.01; 710/313, 710/304, 303; 711/115; 369/292, 30.93, 369/30.96, 30.97, 30.99, 75.2, 77.1, 77.2; 345/156, 157, 168, 169; 312/223.1, 223.2, 312/223.3; 70/357, 367, 406, 381, 491; 455/325, 556.1, 550.1, 90.1, 575.1
See application file for complete search history.

(56) References Cited

U.S. PATENT DOCUMENTS
5,179,505 A 1/1993 Matsuo
(Continued)

FOREIGN PATENT DOCUMENTS
JP 5-35931 2/1993
(Continued)

OTHER PUBLICATIONS
International Search Report (PCT/ISA/210) of International Application PCT/JP2006/300281 (mailed on May 30, 2006).
(Continued)

*Primary Examiner* — Jayprakash N Gandhi
*Assistant Examiner* — Jerry Wu
(74) *Attorney, Agent, or Firm* — Fujitsu Patent Center

(57) ABSTRACT

A first card slot extends along a first imaginary plane. A second card slot extends along a second imaginary plane parallel to the first imaginary plane. A printed wiring board is placed between the first and second imaginary planes. A first connector is mounted on the front surface of the printed wiring board. The first connector receives a first card coming through the first card slot. A second connector is mounted on the back surface of the printed wiring board. The second connector receives a second card coming through the second card slot. A guiding member defines a first guiding surface extending along the first imaginary plane and a second guiding surface extending along the second imaginary plane. A space is efficiently utilized at the back surface of the printed wiring board. The first and second cards are enclosed in the enclosure in a layered manner.

9 Claims, 5 Drawing Sheets

U.S. PATENT DOCUMENTS

| | | | |
|---|---|---|---|
| 5,288,247 A | 2/1994 | Kaufman | |
| 5,290,174 A | 3/1994 | Woratyla et al. | |
| 5,297,966 A | 3/1994 | Brennian, Jr. et al. | |
| 5,308,251 A | 5/1994 | Kaufman et al. | |
| 5,318,452 A | 6/1994 | Brennian, Jr. et al. | |
| 5,389,001 A | 2/1995 | Broschard, III et al. | |
| 5,455,746 A | 10/1995 | Sato et al. | |
| 5,590,024 A * | 12/1996 | Honda et al. | 361/679.32 |
| 5,617,301 A | 4/1997 | Sato et al. | |
| 5,627,731 A | 5/1997 | Sato et al. | |
| 5,646,820 A | 7/1997 | Honda et al. | |
| 5,663,867 A | 9/1997 | Honda et al. | |
| 5,905,252 A | 5/1999 | Magana | |
| 6,062,904 A | 5/2000 | Oguchi et al. | |
| 6,186,401 B1 | 2/2001 | Magana | |
| 6,456,504 B1 * | 9/2002 | LoForte et al. | 361/799 |
| 2001/0003074 A1 * | 6/2001 | Johnson et al. | 439/377 |
| 2002/0039910 A1 | 4/2002 | Malthouse | |

FOREIGN PATENT DOCUMENTS

| | | |
|---|---|---|
| JP | 6-110579 | 4/1994 |
| JP | 6-208874 | 7/1994 |
| JP | 6-318363 | 11/1994 |
| JP | 7-13660 | 1/1995 |
| JP | 10-125405 | 5/1998 |
| JP | 11-203398 | 7/1999 |
| JP | 11-232396 | 8/1999 |
| JP | 2002-176479 | 6/2002 |

OTHER PUBLICATIONS

International Preliminary Report on Patentability, mailed Jul. 24, 2008 and issued in corresponding International Patent Application No. PCT/JP2006/300281.

* cited by examiner

ELECTRONIC APPARATUS AND GUIDING MEMBER

This application is a continuing application, filed under 35 U.S.C. §111(a), of International Application PCT/JP2006/300281, filed Jan. 12, 2006, the contents of which are incorporated herein by reference.

BACKGROUND OF THE INVENTION

1. Field of the Invention

The present invention relates to an electronic apparatus comprising: an enclosure; a printed wiring board enclosed in the enclosure; and a connector mounted on the printed wiring board for receiving insertion of a card such as a PC card.

2. Description of the Prior Art

A motherboard is enclosed in the enclosure of a notebook personal computer. Connectors are mounted on the front surface of a printed wiring board of the motherboard for receiving a PC card and a smart card, respectively, for example. The enclosure defines card slots for the PC and smart cards. The outer periphery of the motherboard is opposed to the individual card slots. A card is inserted along the front surface of the motherboard through the corresponding card slot. The card is then received in the corresponding connector.

Both the connectors are mounted on the front surface of the printed wiring board of the motherboard as described above. The connectors occupy a large area on the front surface of the printed wiring board of the motherboard. It is thus impossible to further increase a space for the mounting of electronic components on the front surface of the printed wiring board of the motherboard. In addition, an empty space is established on the back surface of the printed wiring board of the motherboard at the back of the connector. It is impossible to efficiently utilize the inner space of the enclosure.

SUMMARY OF THE INVENTION

It is accordingly an object of the present invention to provide an electronic apparatus contributing to an efficient utilization of an inner space defined in an enclosure. It is also an object of the present invention to provide a guiding member significantly contributing to realization of such a electronic apparatus.

According to a first aspect of the present invention, there is provided an electronic apparatus comprising: a first card slot defined in an enclosure, the first card slot extending along a first imaginary plane; a second card slot defined in the enclosure, the second card slot extending along a second imaginary plane parallel to the first imaginary plane; a printed wiring board enclosed in the enclosure at a position between the first and second imaginary planes; a first connector mounted on the front surface of the printed wiring board, the first connector receiving a first card coming through the first card slot; a second connector mounted on the back surface of the printed wiring board, the second connector receiving a second card coming through the second card slot; and a guiding member defining a first guiding surface extending within the enclosure along the first imaginary plane and a second guiding surface extending within the enclosure along the second imaginary plane.

The electronic apparatus allows the first and second connectors to be mounted on the front and back surfaces of the printed wiring board, respectively. The first and second connectors can be mounted at corresponding areas on the front and back surfaces of the printed wiring board, respectively. A space is efficiently utilized at the back surface of the printed wiring board. The first connector is designed to receive a first card through the first card slot. The second connector is likewise designed to receive a second card through the second card slot. Since the first and second cards are enclosed in the enclosure in a layered manner, the inner space of the enclosure is prevented from being wasted.

In addition, the first card slot and the first guiding surface extend along the first imaginary plane. The guiding member is allowed to guide the insertion of the first card through the first card slot along the first guiding surface. Likewise, the second card slot and the second guiding surface extend along the second imaginary plane. The guiding member is allowed to guide the insertion of the second card through the second card slot along the second guiding surface. The guiding member is in this manner employed to guide both the first card and the second card. The interval can thus be reduced between the first card slot and the second card slot as compared with the case where separate guiding members are employed to guide the first card and the second card.

In addition, even if the first connector is distanced away from the first card slot, the first guiding surface serves to reliably direct the first card along the expected path. It is thus possible to appropriately change the position of the first connector on the printed wiring board. Likewise, even if the second connector is distanced away from the second card slot, the second guiding surface serves to reliably direct the second card along the expected path. It is thus possible to appropriately change the position of the second connector on the printed wiring board. The guiding member can be employed commonly for the first card and the second card regardless of any change in the positions of the first and second connectors.

The electronic apparatus may further comprise an electronic component mounted on the front surface of the printed wiring board at a position between the first imaginary plane and the front surface of the printed wiring board. The electronic apparatus allows the first guiding surface to guide the movement of the first card along the first imaginary plane. An electronic component can be mounted on the front surface of the printed wiring board in a space between the first imaginary plane and the front surface of the printed wiring board. The printed wiring board provides a larger space for the mounting of electronic components regardless of the space containing the first card.

The enclosure of the electronic apparatus may include an auxiliary guiding portion formed on the inner surface of the enclosure at a position opposed to the second guiding surface so that a gap is defined between the auxiliary guiding portion and the second guiding surface. The gap corresponds to the dimension of a receiving opening of the second connector. The second card is inserted between the second guiding surface and the auxiliary guiding piece. Since the gap between the second guiding surface and the auxiliary guiding piece corresponds to the dimension of the receiving opening of the second connector, the second guiding surface and the auxiliary guiding piece in combination serve to guide the second card to the second connector in a facilitated manner.

The guiding member may include: a front end piece defining the first guiding surface; a rear end piece defining the second guiding surface; and a vertical piece connecting the rear end of the front end piece to the front end of the rear end piece. The vertical piece stands upright from the first imaginary plane toward the second imaginary plane. The front end piece of the guiding member may have a plate portion at its front end opposed to the first card slot. Since the plate portion is opposed to the first card slot, the appearance of the inner surface of the first card slot is improved in the electronic apparatus.

The front end piece of the guiding member may have a pair of auxiliary guiding portions formed on the back surface of the front end piece of the guiding member. The auxiliary guiding portions are continuous with the rear end piece. The auxiliary guiding portions are spaced from each other at an interval equivalent to the sum of the width of the second card and a certain amount of play. The second card inserted through the second card slot is guided between the auxiliary guiding pieces. The auxiliary guiding pieces serve to position the second card in the lateral direction corresponding to the width of the second card. The second card is thus guided to the second card slot in a facilitated manner.

A guiding member may be provided to guide the insertion of a card in the aforementioned electronic apparatus. The guiding member is mounted on an electronic apparatus having a card slot. The guiding member may comprise: a front end piece extending along the first imaginary plane when the guiding member is mounted on the back surface of the printed wiring board; a rear end piece extending along the second imaginary plane when the guiding member is mounted on the back surface of the printed wiring board; and a vertical piece connecting the rear end of the front end piece to the front end of the rear end piece. The vertical piece stands upright from the first imaginary plane toward the second imaginary plane.

The rear end piece of the guiding member may have the thickness corresponding to the height from the printed wiring board to the receiving opening of the second connector. The rear end piece serves to guide the insertion of the second card through the second card slot. Since the thickness of the rear end piece corresponds to the height from the printed wiring board to the receiving opening of the second connector, the second card is thus guided to the second connector along the rear end piece in a facilitated manner.

The front end piece of the guiding member may have a plate portion at its front end opposed to the first card slot in the same manner as described above. The front end piece of the guiding member may have a pair of auxiliary guiding portions formed on the back surface of the front end piece. The auxiliary guiding portions are continuous with the rear end piece. The auxiliary guiding portions are spaced from each other at an interval equivalent to the sum of the width of the second card and a certain amount of play.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
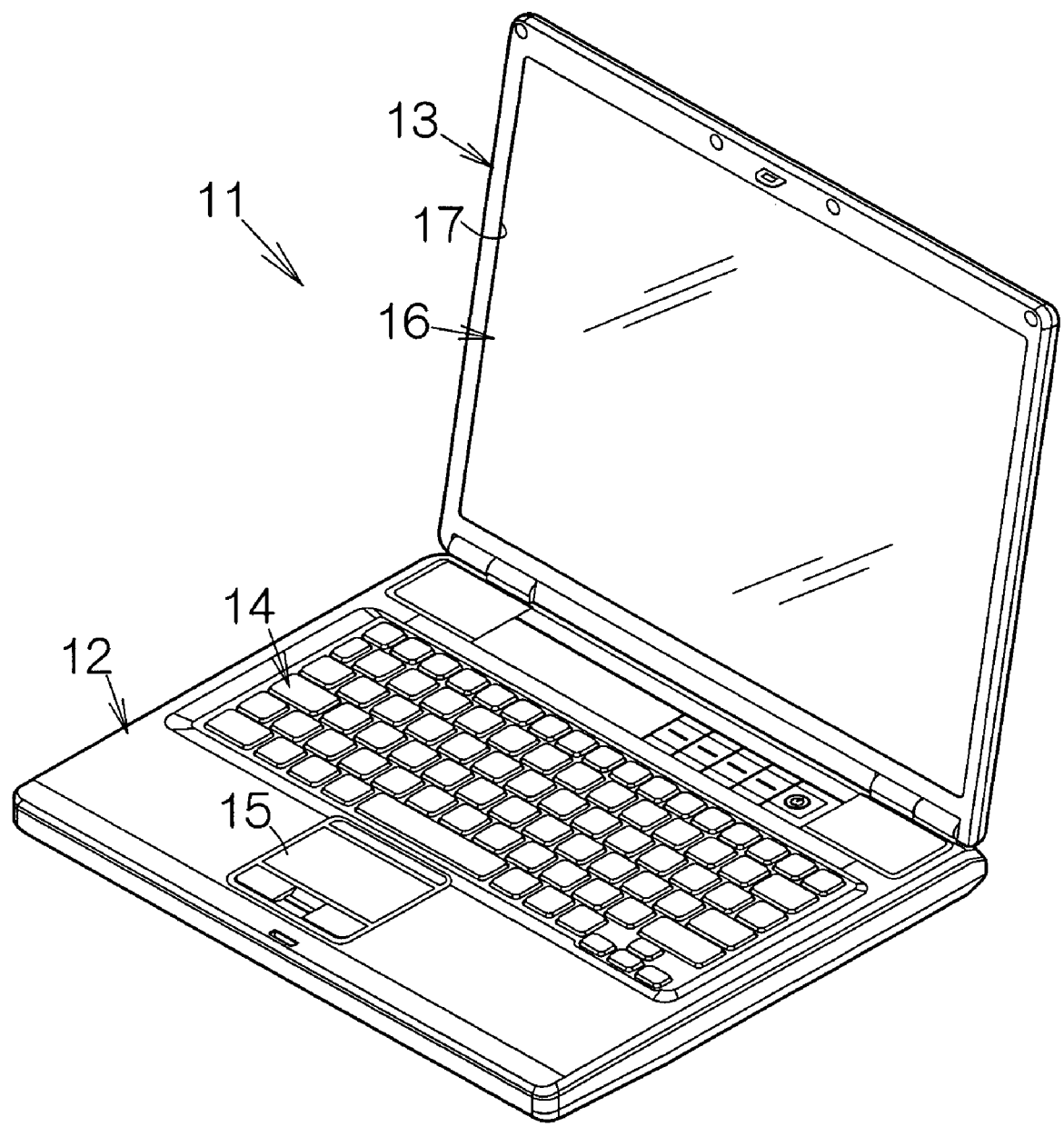
FIG. 1 is a perspective view schematically illustrating a notebook personal computer as a specific example of an electronic apparatus according to the present invention.

FIG. 1 schematically illustrates a notebook personal computer 11 as a specific example of an electronic apparatus according to the present invention. The notebook personal computer 11 includes a thin main body 12 and a display enclosure 13. The display enclosure 13 is coupled to the main body 12 for relative swinging movement. Input devices such as a keyboard 14 and a pointing device 15 are embedded in the surface of the main body 12, for example. Users manipulate the keyboard 14 and/or the pointing device 15 to input commands and/or data.

A liquid crystal display (LCD) panel module 16 is enclosed in the display enclosure 13, for example. The screen of the LCD panel module 16 is exposed within a window opening 17 defined in the display enclosure 13. Texts and graphics appear on the screen. Users can see the ongoing operation of the notebook personal computer 11 based on the texts and graphics on the screen. The display enclosure 13 can be superposed on the main body 12 through the swinging movement relative to the main body 12.

Figure 2:
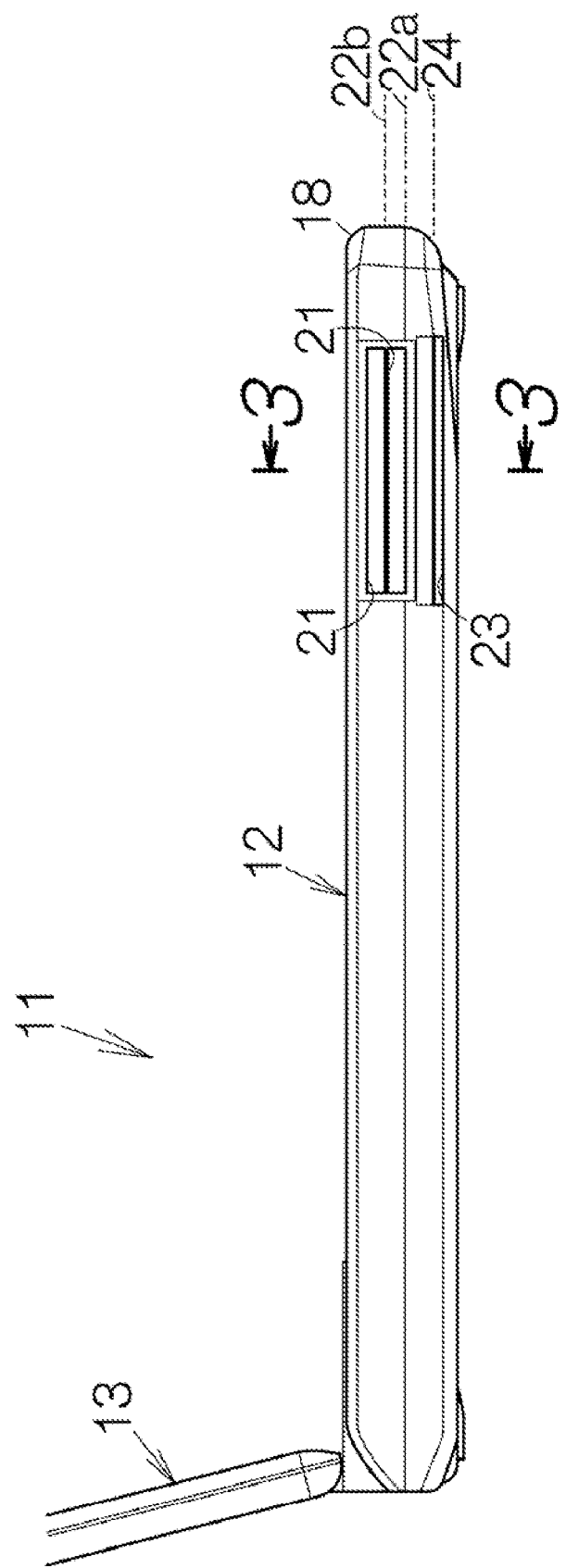
FIG. 2 is a side view of the notebook personal computer.

As shown in FIG. 2, the main body 12 includes an enclosure 18 having first card slots 21, 21 for receiving PC cards, respectively. The first card slots 21 are designed to extend along first imaginary planes 22a, 22b, respectively. The first imaginary planes 22a, 22b are designed to extend in parallel with each other. The enclosure 18 also has a second card slot 23 for receiving a smart card. The second card slot 23 is designed to extend along a second imaginary plane 24. The second imaginary plane 24 is defined in parallel with the first imaginary planes 22a, 22b.

Here, a PC card can be an extension card such as a flash memory card, a SCSI (small computer system interface) card, a LAN (local area network) card, a modem card, and the like, for example. Such a PC card enables extension of the functions of the notebook personal computer 11. An IC (integrated circuit) chip having a CPU (central processing unit) and a memory is incorporated in the smart card, for example. Information data and application software is stored in the memory. A card reader is utilized to read out the information data and application software, as described later. The smart card can be utilized for authentication of users of the notebook personal computer 11, for example.

Figure 3:
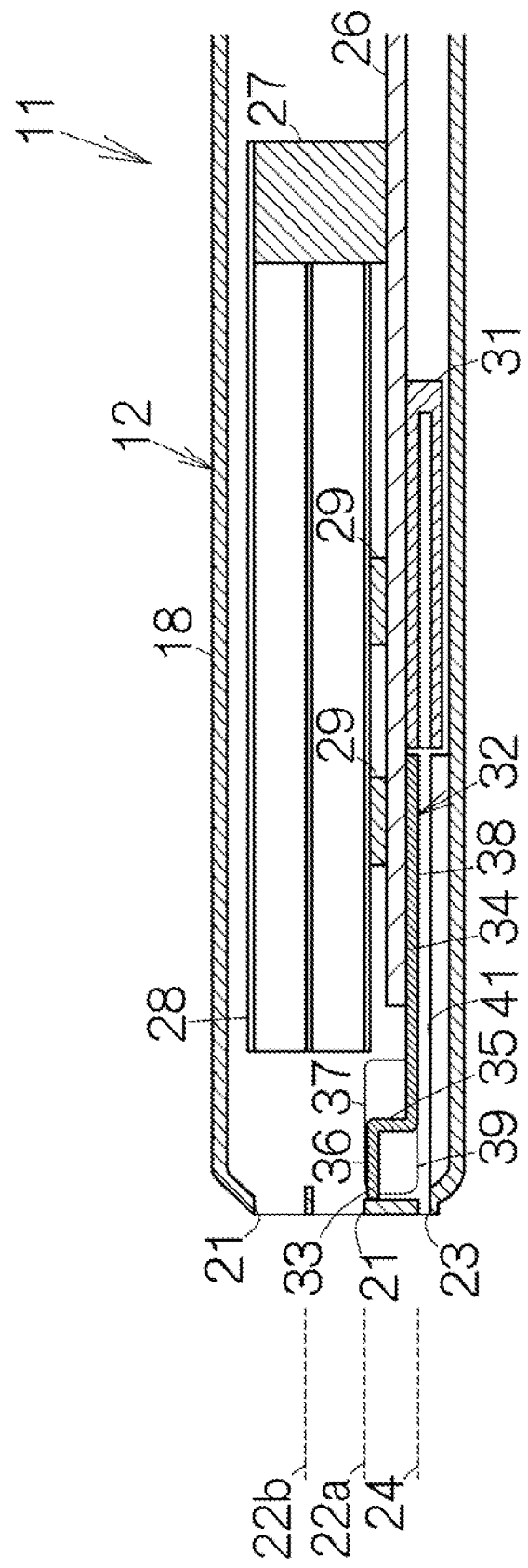
FIG. 3 is a sectional view taken along the line 3-3 in FIG. 2.

As shown in FIG. 3, a motherboard 26 including a printed wiring board is enclosed in the enclosure 18. The printed wiring board of the motherboard 26 is placed in a space between the first imaginary plane 22a and the second imaginary plane 24. Electronic circuit elements, not shown, are mounted on the printed wiring board of the motherboard 26. Such electronic circuit elements are a CPU, a chip set for a CPU, a memory, a graphic chip and an audio circuit, for example. The CPU executes various kinds of processing based on software programs and/or data temporarily held in the memory, for example. The software programs and/or data may be stored in a mass storage such as a hard disk drive (HDD) likewise enclosed in the enclosure 18.

A first connector, namely a PC card connector 27, is mounted on the front surface of the printed wiring board of the motherboard 26. The PC card connector 27 is designed to receive insertion of a first card, namely a PC card, coming through the first card slot 21. The PC card connector 27 is designed to receive a connector incorporated in the PC card. The PC card connector 27 includes a casing member 28 defining layered spaces in the form of a flat parallelepiped, for example. The casing member 28 is expected to enclose PC cards. The casing member 28 is made out of a plate material or materials, for example. The casing member 28 may constitute the PC card connector 27, for example.

The casing member 28 is placed on the first imaginary plane 22a, one near the motherboard 26. A certain constant gap is formed between the casing member 28 and the printed wiring board of the motherboard 26. Electronic components 29, 29, . . . can be placed in the gap. The electronic components 29, 29 may be mounted on the front surface of the printed wiring board of the motherboard 26. The electronic components 29 include an audio circuit, for example. The gap contributes to establishment of an enlarged space for the mounting of electronic components on the front surface of the printed wiring board of the motherboard 26 irrespective of the casing member 28 mounted on the front surface of the printed wiring board of the motherboard 26.

A second connector, namely a smart card connector 31, is mounted on the back surface of the printed wiring board of the motherboard 26. The smart card connector 31 is designed to receive insertion of a smart card coming through the second card slot 23. The projection of the smart card connector 31 on the second imaginary plane 24 overlies on the projection of the PC card connector 27 on the second imaginary plane 24. The smart card connector 31 serves as a card reader for a smart card. The smart card connector 31 is capable of reading out information data from the IC chip inside a smart card.

Figure 4:
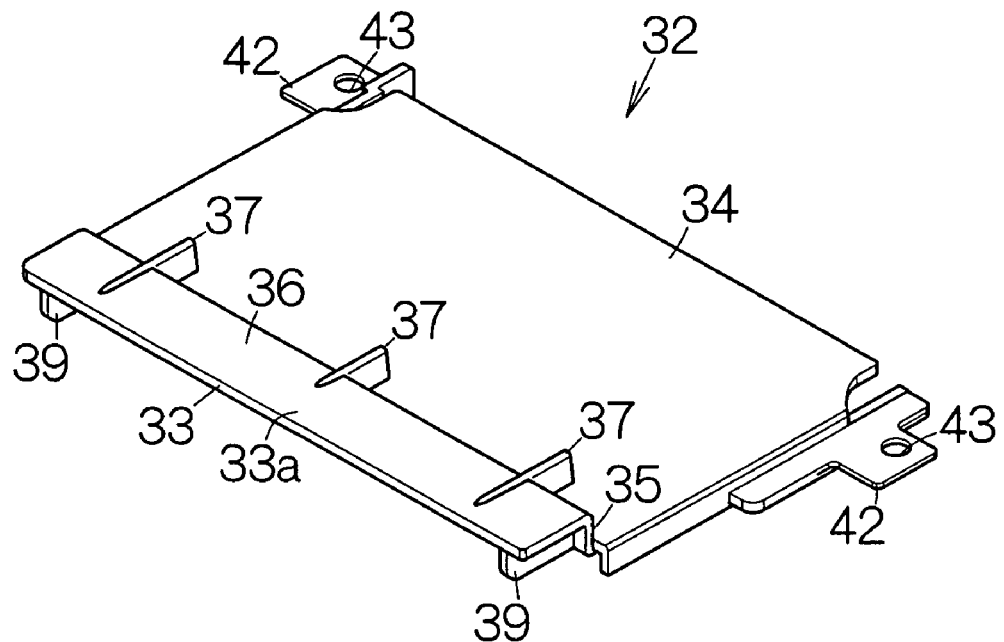
FIG. 4 is a perspective view schematically illustrating a guiding member according to the present invention.

A guiding member 32 is enclosed in the enclosure 18 in a space between the first imaginary plane 22a and the second imaginary plane 24. Referring also to FIG. 4, the guiding member 32 defines a front end piece 33, a rear end piece 34 and a vertical piece 35. The front end piece 33 extends along the first imaginary plane 22a. The rear end piece 34 extends along the second imaginary plane 24. The vertical piece 35 connects the rear end of the front end piece 33 to the front end of the rear end piece 34. The width of the guiding member 32, measured along the front end of the front end piece 33, may correspond to the width of the first card slot 21. Here, the width of the guiding member 32 may be set equal to the width of the first card slot 21.

The front end piece 33 defines a plate portion 33a at its front end opposed to the first card slot 21. The front surface of the plate portion 33a defines a first guiding surface 36 extending from the first card slot 21 toward the front end of the casing member 28. The first guiding surface 36 extends along the first imaginary plane 22a. If an unexpected substance comes into the enclosure 18 through the first card slot 21, the first guiding surface 36 serves to prevent such an unexpected substance from dropping into a space between the back surface of the printed wiring board of the motherboard 26 and the bottom plate of the enclosure 18. In addition, the first guiding surface 36 is visible through the first card slot 21. The appearance of the inner surface of the first card slot 21 is improved.

Auxiliary guiding pieces, namely ribs 37, are formed in the guiding member 32. The ribs 37 extend from the back surface of the vertical piece 35 toward the front end of the casing member 28. The ribs 37 each define an auxiliary guiding surface continuous with the first guiding surface 36.

As is apparent from FIG. 3, the vertical piece 35 stands uptight from the first imaginary plane 22a to the second imaginary plane 24. The vertical piece 35 thus has a surface opposed to the outer periphery of the motherboard 26. The vertical piece 35 serves to define a step between the front end piece 33 and the rear end piece 34. Here, the height of the vertical piece 35 may be set larger than the thickness of the printed wiring board of the motherboard 26 but smaller than the interval between the first and second imaginary planes 22a, 24.

Figure 5:
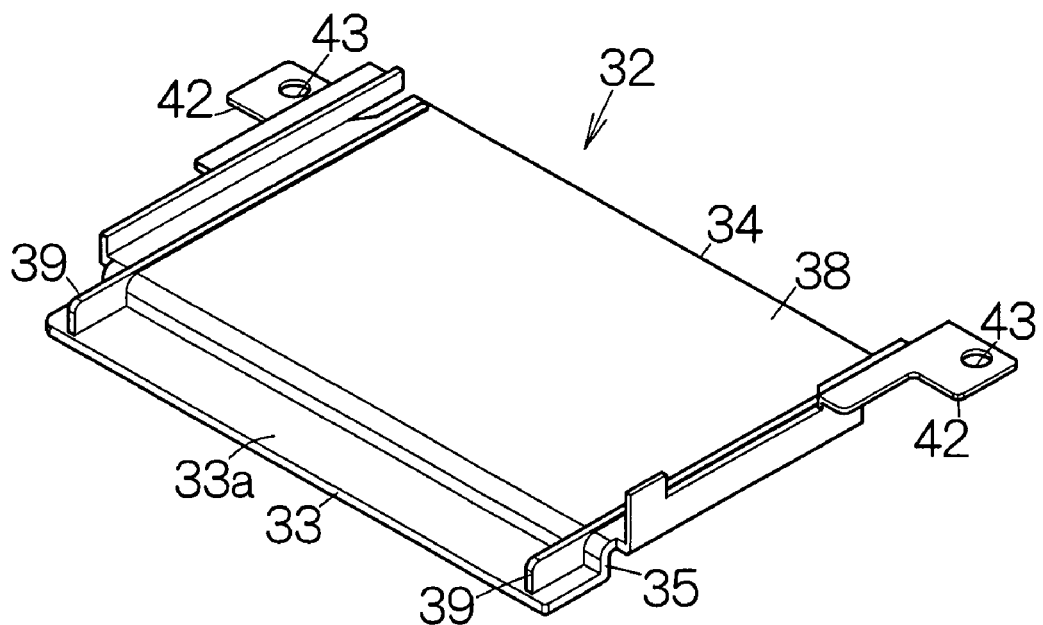
FIG. 5 is a perspective view schematically illustrating the guiding member.

The front surface of the rear end piece 34 is received on the back surface of the printed wiring board of the motherboard 26. The thickness of the rear end piece 34 corresponds to the height from the printed wiring board of the motherboard 26 to the receiving opening of the smart card connector 31. Referring also to FIG. 5, the back surface of the rear end piece 34 defines a second guiding surface 38 extending from the front end of the smart card connector 31 toward the second card slot 23. The second guiding surface 38 extends along the second imaginary plane 24.

A pair of auxiliary guiding portions, namely ribs 39, 39, is formed integral with the guiding member 32. The ribs 39 protrude from the front surface of the vertical piece 35 toward the second card slot 23. The ribs 39 are thus continuous from the back surface of the front end piece 33 to the rear end piece 34. The ribs 39, 39 are spaced from each other at an interval equivalent to the sum of the width of a smart card and a certain amount of play or space. The ribs 39 serve to guide the insertion of a smart card through the second card slot 23.

The enclosure 18 includes auxiliary guiding pieces, namely ribs 41. The ribs 41 are formed on the inner surface of the enclosure 18 at a position opposed to the second guiding surface 38 of the guiding member 32. The ribs 41 extend from the second card slot 23 toward the smart card connector 31. A constant gap may be defined between the ribs 41 and the second guiding surface 38 over the overall length of the ribs 41. The gap may correspond to the dimension of the receiving opening of the smart card connector 31. The insertion of the smart card through the second card slot 23 is easily guided to the receiving opening of the smart card connector 31 in this manner.

As is apparent from FIGS. 4 and 5, a pair of attachment pieces 42, 42 protrudes from the respective sides of the rear end piece 34 of the guiding member 32 in the opposite directions from each other. A through bore 43 is formed in the individual attachment pieces 42. The guiding member 32 may be attached to the motherboard 26 at the attachment pieces 42, 42, for example. Screws may be screwed into the printed wiring board of the motherboard 26 through the through bores 43 of the attachment pieces 42 for attachment of the guiding member 32.

In the guiding member 32, the front end piece 33, the rear end piece 34, the vertical piece 35, the ribs 37, 39 and the attachment pieces 42 may be formed integral as a one-piece component. A molding process may be employed to realize such a one-piece component. The front end piece 33, the rear end piece 34, the vertical piece 35, the ribs 37, 39 and the attachment pieces 42 may be made of a resin material, for example.

Figure 6:
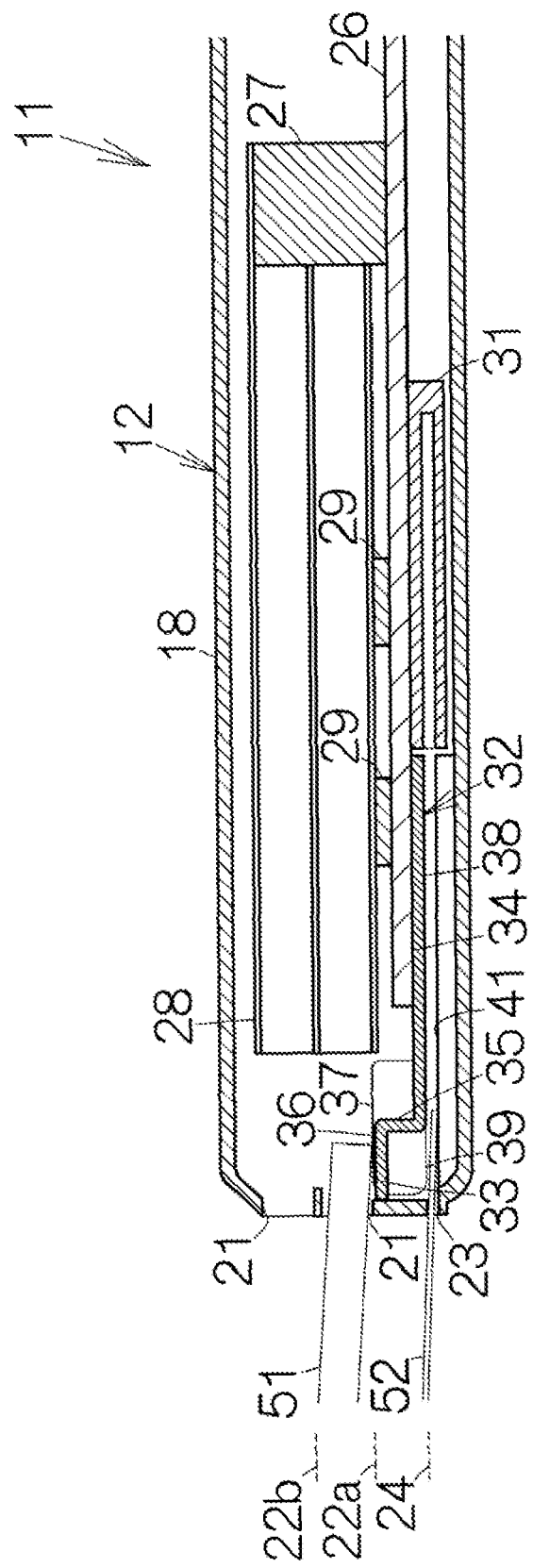
FIG. 6 is a sectional view, corresponding to FIG. 3, schematically illustrating insertion of a PC card and a smart card into an enclosure.

Now, assume that a PC card is inserted into the first card slot 21. As shown in FIG. 6, a PC card 51 is received into the first card slot 21. The front end of the PC card 51 is received on the first guiding surface 36 and the ribs 37. The first guiding surface 36 and the ribs 37 serve to guide the insertion of the PC card 51. The PC card 51 is then received in the casing member 28. The PC card 51 is guided along the casing member 28. The connector of the PC card 51 is in this manner coupled with the PC card connector 27. The PC card 51 enables extension of the functions of the notebook personal computer 11.

Next, assume that a smart card is inserted into the second card slot 23. As shown in FIG. 6, a smart card 52 is received into the second cards lot 23. The smart card 52 is guided between the ribs 39, 39. The second guiding surface 38 and the ribs 41 serve to guide the smart card 52. The smart card 52 is in this manner received in the smart card connector 31. The smart card connector 31 serves to read out information data from the IC chip. Authentication of a user is in this manner executed in the notebook personal computer 11.

The notebook personal computer 11 allows the PC card connector 27 and the smart card connector 31 to be mounted at corresponding areas on the front and back surfaces of the printed wiring board of the motherboard 26, respectively. A space is thus efficiently utilized at the back surface of the motherboard 26. In addition, the contour of the PC card 51 is quite similar to that of the smart card 52. Accordingly, when the PC card 51 is superimposed on the smart card 52 in the enclosure 18, the inner space of the enclosure 18 is prevented from being wasted.

In addition, the guiding member 32 allows the first guiding surface 36 to guide the PC card 51. Likewise, the guiding member 32 allows the second guiding surface 38 to guide the smart card 52. The guiding member 32 is employed to guide both the PC card 51 and the smart card 52. The interval is thus reduced between the first card slot 21 and the second card slot 23 as compared with the case where separate guiding members are employed to guide the PC card 51 and the smart card 52, respectively.

In addition, the electronic components 29 are mounted on the front surface of the printed wiring board of the motherboard 26 in a space between the casing member 28 and the motherboard 26. A space is established for the mounting of the electronic components 29 on the front surface of the printed wiring board of the motherboard 26 regardless of the existence of the casing member 28. The casing member 28 is placed along the first imaginary plane 22*a*. The first guiding surface 36 is thus allowed to reliably guide the PC card 51 to the casing member 28. The electronic components 29 are reliably prevented from contact or collision of the PC card 51. This results in a reliable prevention of damages to the PC card 51 and the electronic components 29.

In addition, even if the PC card connector 27 is distanced away from the first card slot 21, the first guiding surface 36 reliably serves to direct the PC card 51 along the expected path. It is thus possible to appropriately change the position of the PC card connector 27 mounted on the motherboard 26. Likewise, even if the smart card connector 31 is distanced away from the second card slot 23, the second guiding surface 38 and the ribs 41 reliably serve to direct the smart card 52 along the expected path. It is thus possible to appropriately change the position of the smart card connector 31 mounted on the motherboard 26. The guiding member 32 can be employed commonly for the PC card 51 and the smart card 52 regardless of any change in the positions.

What is claimed is:

1. An electronic apparatus comprising:
a first card slot defined in an enclosure, the first card slot extending on a first imaginary plane;
a second card slot defined in the enclosure, the second card slot extending on a second imaginary plane parallel to the first imaginary plane;
a printed wiring board enclosed in the enclosure at a position between the first and second imaginary planes;
a first connector mounted on a front surface of the printed wiring board, the first connector receiving a first card coming through the first card slot;
a second connector mounted on a back surface of the printed wiring board, the second connector receiving a second card coming through the second card slot; and
a guiding member defining a first guiding surface extending within the enclosure on the first imaginary plane and a second guiding surface extending within the enclosure on the second imaginary plane, wherein
the guiding member includes:
a front end piece defining the first guiding surface;
a rear end piece defining the second guiding surface; and
a vertical piece connecting a rear end of the front end piece to a front end of the rear end piece, the vertical piece standing upright from the first imaginary plane toward the second imaginary plane.

2. The electronic apparatus according to claim 1, further comprising an electronic component mounted on the front surface of the printed wiring board at a position between the first imaginary plane and the front surface of the printed wiring board.

3. The electronic apparatus according to claim 1, wherein the enclosure includes an auxiliary guiding portion formed on an inner surface of the enclosure at a position opposed to the second guiding surface so that a gap is defined between the auxiliary guiding portion and the second guiding surface, the gap corresponding to a dimension of a receiving opening of the second connector.

4. The electronic apparatus according to claim 1, wherein the front end piece of the guiding member has a plate portion at a front end of the front end piece opposed to the first card slot.

5. The electronic apparatus according to claim 1, wherein the front end piece of the guiding member has a pair of auxiliary guiding portions formed on a back surface of the front end piece of the guiding member, the auxiliary guiding portions being continuous with the rear end piece, the auxiliary guiding portions being spaced from each other at an interval equivalent to a width of the second card and a certain amount of play.

6. A guiding member mounted on an electronic apparatus having a card slot, the guiding member designed to guide insertion of a card,
the electronic apparatus including:
an enclosure;
a first card slot defined in the enclosure, the first card slot extending on a first imaginary plane;
a second card slot defined in the enclosure, the second card slot extending on a second imaginary plane parallel to the first imaginary plane;
a printed wiring board enclosed in the enclosure at a position between the first and second imaginary planes;
a first connector mounted on a front surface of the printed wiring board, the first connector receiving a first card coming through the first card slot; and
a second connector mounted on a back surface of the printed wiring board, the second connector receiving a second card coming through the second card slot,
the guiding member including:
a front end piece extending on the first imaginary plane when the guiding member is mounted on the back surface of the printed wiring board;
a rear end piece extending on the second imaginary plane when the guiding member is mounted on the back surface of the printed wiring board; and
a vertical piece connecting a rear end of the front end piece to a front end of the rear end piece, the vertical piece standing upright from the first imaginary plane toward the second imaginary plane.

7. The guiding member according to claim 6, wherein a thickness of the rear end piece corresponds to a height from the printed wiring board to a receiving opening of the second connector.

8. The guiding member according to claim 6, wherein the front end piece has a plate portion at a front end of the front end piece opposed to the first card slot.

9. The guiding member according to claim 6, wherein the front end piece has a pair of auxiliary guiding portions formed on a back surface of the front end piece, the auxiliary guiding portions being continuous with the rear end piece, the auxiliary guiding portions being spaced from each other at an interval equivalent to a width of the second card and a certain amount of play.

* * * * *